Patented Jan. 30, 1951

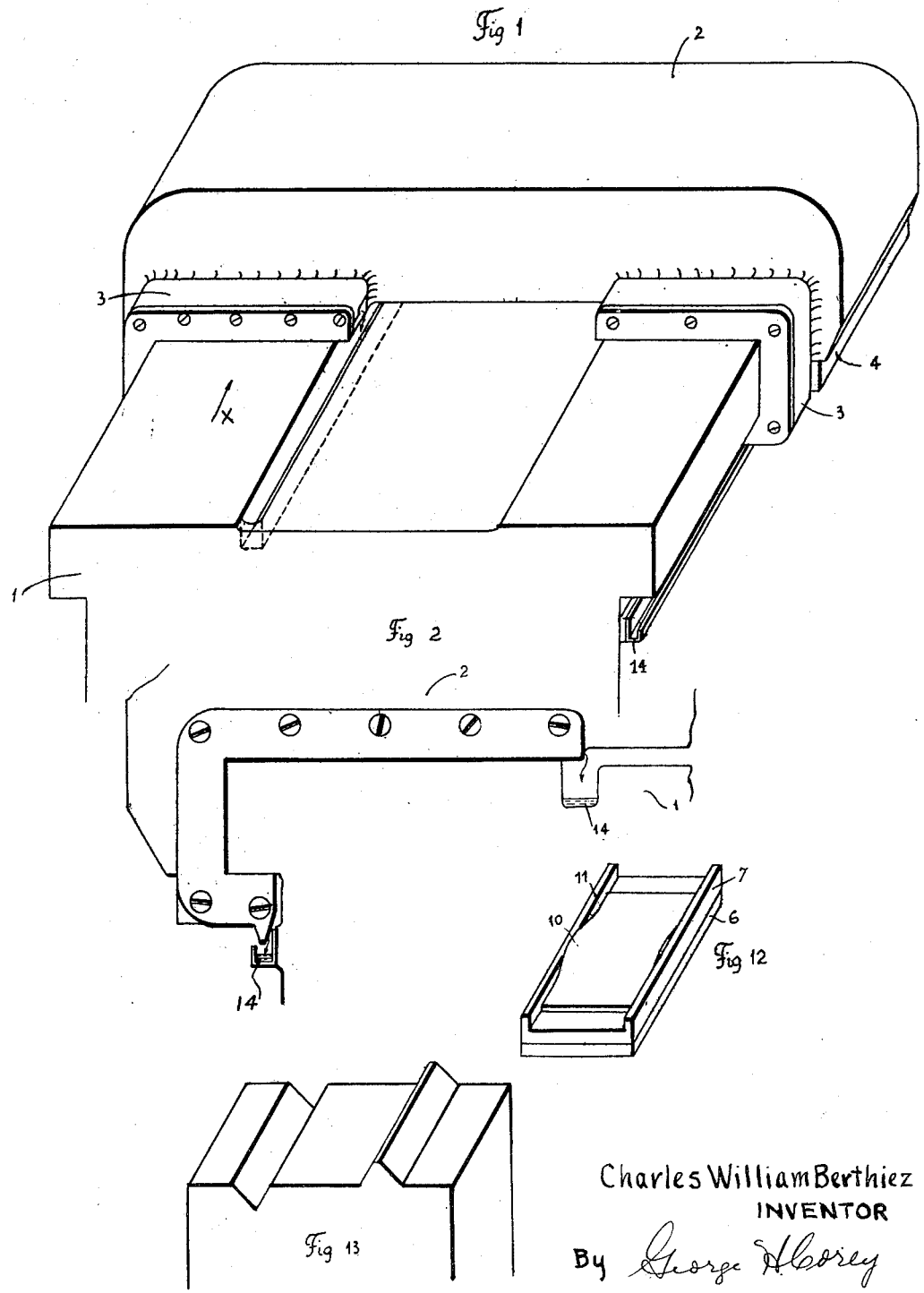

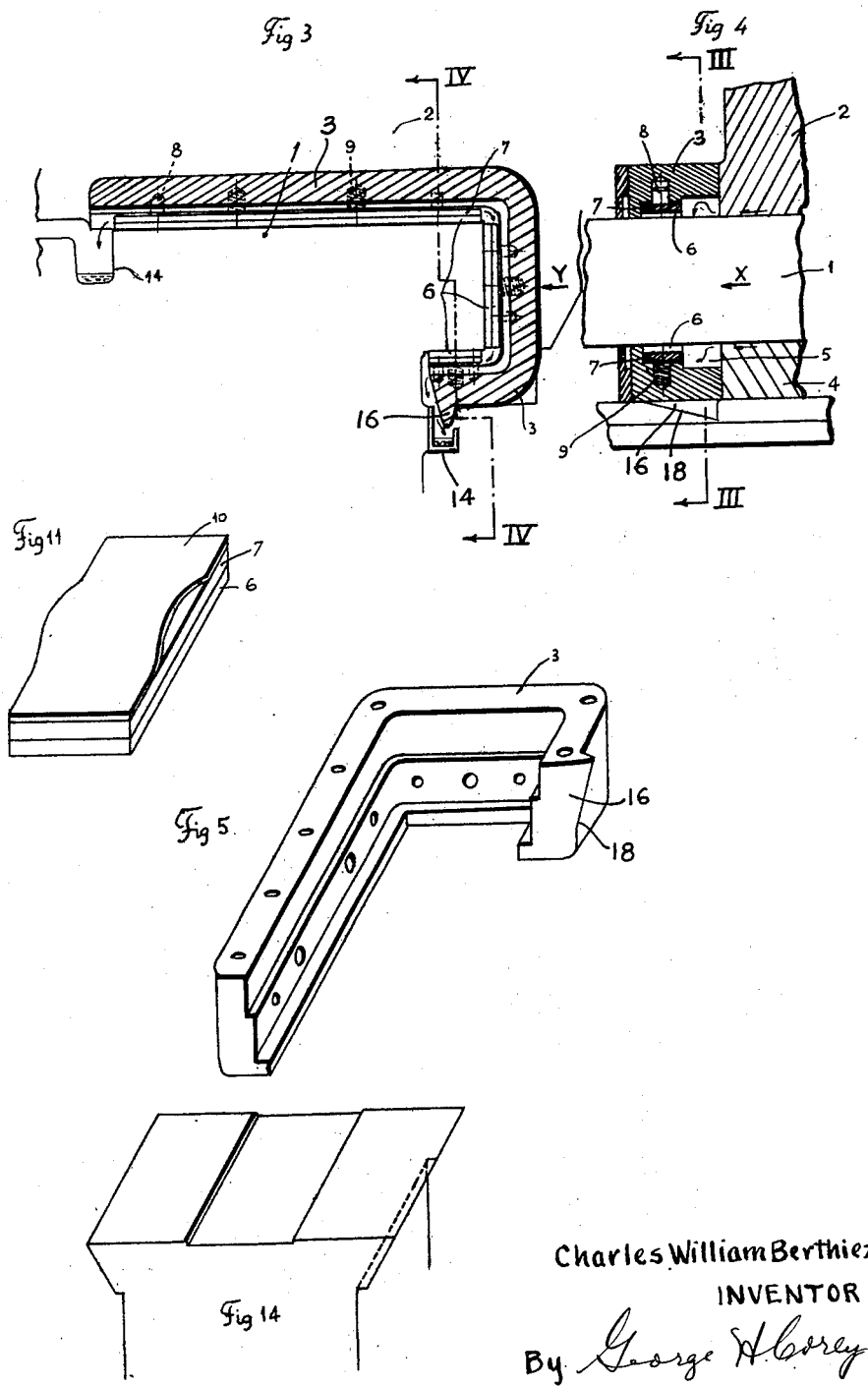

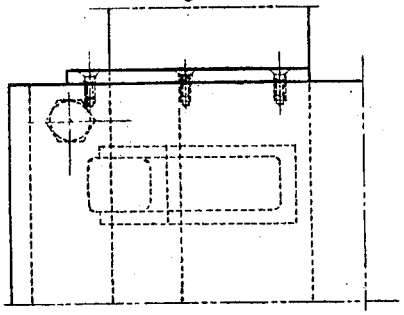
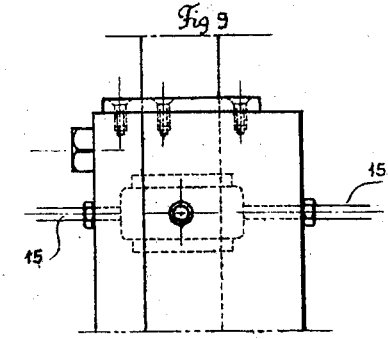
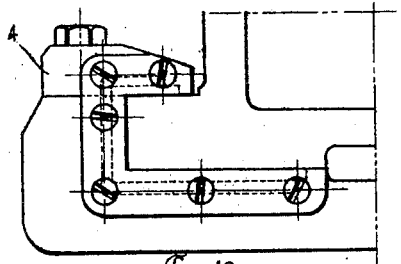
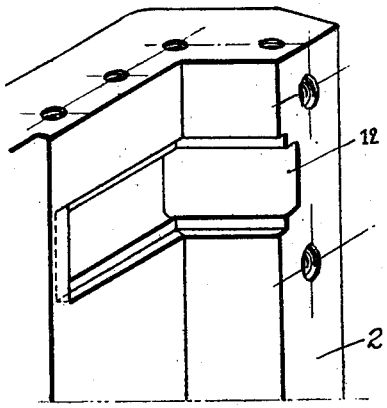
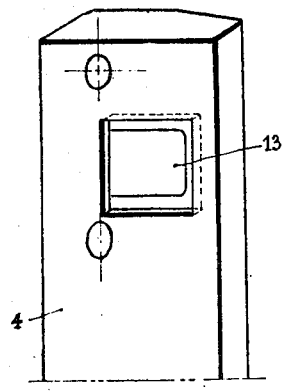

2,539,769

UNITED STATES PATENT OFFICE 2,539,769

OIL RECUPERATOR FOR MACHINE SLIDEWAYS

Charles William Berthiez, Paris, France

Application April 11, 1945, Serial No. 587,774
In France December 16, 1943

Section 1, Public Law 690, August 8, 1946
Patent expires December 16, 1963

8 Claims. (Cl. 308—3.5)

This invention has reference to the recovery of oil used for lubricating the slideways or runways of movable members or carriages involved in machines in general and more particularly in machine tools and it relates more specifically though not exclusively to the recovery of lubricating oil injected under pressure between mutually sliding surfaces of such machines.

As is known, lubricating systems wherein oil is injected under pressure between mutually sliding surfaces of such machines as they are used at present have the disadvantage of allowing the oil to squirt out at the outlet end of the slideways or runways, thereby flooding the machine and wasting the oil. This oil may become contaminated with foreign material making it unsuitable for reuse. This necessitates purification of the oil before its reuse which ordinarily must be carried out at a point remote from where it squirted out.

It is an object of the present invention to provide new and improved oil recovery means so constructed as to obviate the above-stated disadvantage while enabling the oil that squirts out under pressure or sometimes overflow (in gravitational lubricating systems) to be readily collected by channels or ducts leading to an oil collector, whence the oil can be re-utilised.

Another object of the invention is to provide oil recovery means as aforesaid wherein the squirting or overflowing oil is automatically collected in one or more depression chambers matching the outline of the contacting surfaces under lubrication and communicating with discharge or outflow channels.

A further object of the invention is to provide an oil recovery device wherein the depression chamber can be machined either in the movable member or carriage itself of the machine or alternatively in a separate part such as a retaining flange or frame associated with said carriage.

A still further object of the invention is to provide an oil recovery device as aforesaid involving oil-scraping means which assist in the prevention of undue losses of the oil to be recovered, said means being combinable with spring means which constantly urge the oil scraping means into proper contact with the sliding surfaces from which the oil must be scraped and then discharged through channels leading to the collector.

With these and other objects in view, as will incidentally appear hereafter, the invention comprises the novel construction and combination of parts that will now be described more in detail with reference to the accompanying diagrammatic drawings exemplifying embodiments of the invention and forming a part of the present disclosure.

In the drawings:

Figure 1 is a perspective view showing a machine carriage and slideway assembly having the oil recovery device according to the invention fitted thereto.

Figure 2 is an end view looking in the direction shown by the arrow X in Fig. 1 and showing the recovery device in relation to the left hand slideway of the two slideways represented in Fig. 1.

Figure 3 is a partial sectional view of the recovery device taken on the line III—III of Fig. 4.

Figure 4 is a partial sectional view of the recovery device taken on the line IV—IV of Fig. 3.

Figure 5 is an internal perspective view showing separately one of the removable oil recovery frames removed from the end of the carriage shown in Fig. 1.

Figure 6 is a perspective view showing a carriage separated from its guiding slideway and having the oil-collecting depression chamber machined in the carriage body.

Figure 7 is a perspective view showing the retaining flange dismantled from the carriage shown in Fig. 6.

Figure 8 is a view looking upward in Fig. 10 of a portion of a slideway associated with a carriage assembly utilizing parts shown in Figs. 6 and 7.

Figure 9 is an elevational view of the same assembly taken at the left of Fig. 8.

Figure 10 is an end elevational view of the assembly of Figs. 8 and 9.

Figures 11 and 12 are perspective views of two different forms of the oil scrapers which may be used in the oil recovery device according to the invention.

Figures 13 and 14 are perspective views of modified forms of slideways utilisable according to the invention.

As shown by Fig. 1, the bed 1 of the machine, which may be for example the bed of a machine tool, constitutes the stationary element of the assembly on which a carriage 2 is arranged for sliding motion. At each end of the carriage 2 it is provided with an oil recovery attachment according to the invention having a frame 3 formed with a contour matching the outline of the slideway or runway outline.

As in the known art, lubricating oil under pressure is injected by any suitable means (not shown) between the bed faces and the carriage faces which are arranged in sliding contact relation.

The lubricating oil then flows in film form between the sliding surfaces of the bed 1 and carriage 2, also along the adjacent faces of retaining flanges 4 for the carriage. The oil fulfils its lubricating function till it reaches the carriage ends where it squirts into a depression chamber 5 (see particularly Fig. 4) constituted by a peripheral recess, Fig. 3, formed in the frame 3 and discharging said oil into properly disposed return channels or ducts 14 which lead to an oil collector.

Should the device be restricted solely to this arrangement, the purpose aimed at would not be completely fulfilled because a portion of the oil could still escape between the contact edge of frame 3 and the surfaces of the guiding bed 1. This loss is obviated by the provision, immediately after the depression chamber 5 and on each sliding surface, of small oil scrapers. These are constituted by strips 6 of felt or other adequate soft scraping material such as brass and are operatively connected for example by a riveting, clinching, cementing or similar process to rigid (metallic or non-metallic) foundation or backing strips 7. Each composite strip thus constituted carries at right angles to its rigid face studs 8 which have a sliding fit into the body of the frame 3 and thus provide for slight movement of the strips while preventing the oil scraper from moving away from its proper position with respect to the depression chamber 5. In parallelism with the guiding studs 8 are arranged springs 9 which operate by compression and are adapted to press the scrapers into contact with the sliding surfaces to be oil scavenged.

Constructional modifications may be introduced into the oil recuperating device so far described. Thus in particular the compression or coil springs 9 might be replaced for example by leaf spring such as 10 (Figs. 11 and 12) operating by flexure. Moreover the guiding studs 8 might be omitted and their action superseded by an appropriate protruding shape given to the scraper edges as illustrated at 11 in Figure 12, the ribs 11 cooperating with suitably formed parts of the frame to hold the scraper in place in the frame.

Moreover, the depression chamber, instead of being provided at the end of each movable member or carriage by a separate frame member such as 3 (as shown in Figs. 1 to 5), may be machined in the body itself of the sliding carriage 2 as shown at 12 on Fig. 6 and in the body of the retaining flange 4 as shown at 13 in Fig. 7, when such a flange is provided as in the constructional forms represented in Figs. 1 to 10.

A number of depression chambers may be provided one after the other, such chambers being formed in the body of the sliding carriage 2 or in a separate part arranged at the ends of the carriage slideways to carry out the essential feature of the invention. This also applies to the number of oil scrapers and to the relative position of such scrapers and depression chamber or chambers.

The oil recovered in the recovery device 3 may be discharged thereby into ducts or channels such as 14 extending parallel to the guiding slideways, as shown in Figs. 1, 2, 3 and 4. As shown in Figs. 2, 3, 4 and 5 the oil may drip into the channel 14 from a drip element 16 of V section formed on frame 3 and having a bottom inclined edge 18. Such oil can be led through rigid pipes or flexible hoses such as 15 extending from the periphery of the depression chamber 5, as shown in Fig. 9.

The oil-scraping strips may have any suitable cross sectional shape so as to conform to the shape of the bed, for example, a triangular shape (see Fig. 13) or a quadrangular shape or a dovetail shape (see Fig. 14). All such and similar minor variations are included in the scope of the subjoined claims.

What is claimed is:

1. In a machine tool or the like the combination with a supporting member having a slideway surface of substantial length and width, and a member supported by said supporting member upon said slideway surface and movable lengthwise along said slideway surface with a surface thereof in sliding bearing contact with said slideway surface, said bearing surface of said movable member being covered by said slideway surface throughout the full extent of the movement of said movable member upon said slideway surface to maintain the bearing of said movable member upon said supporting member, said members being adapted to receive oil between said contacting bearing surfaces thereof to lubricate said surfaces as they move relative to each other, of means movable along said slideway surface with said movable member and cooperating therewith and with the surface of said slideway to provide a chamber movable with said movable member and adapted in any position of said movable member along said slideway to receive the oil leaking from between said surfaces, means supported within said chamber to be movable with said movable member along said slideway surface and cooperating with said slideway surface for preventing passage of the oil past said chamber upon said slideway surface, and means cooperating with said supporting and said movable members for conducting the oil entering said chamber therefrom to a place of disposal.

2. In a machine tool or the like the combination as defined in claim 1 in which said means movable along said slideway surface with said movable member and cooperating therewith and with the surface of said slideway to provide said chamber comprises a device carried by said movable member and providing closing walls of said chamber oppositely disposed relative to and in spaced relation respectively to said slideway surface and said member, said means supported within said chamber and cooperating with said slideway surface for preventing passage of the oil past said chamber being supported by said device for movement thereof with said device and said movable member.

3. In a machine tool or the like the combination as defined in claim 2 in which said means supported within said chamber and cooperating with said slideway surface for preventing passage of oil past said chamber comprises scraping means supported by said device within said chamber and bearing on said slideway surface to remove the oil clinging thereto and to deposit it within said chamber.

4. In a machine tool or the like the combination with a supporting member having a slideway surface of substantial length and width, a member supported by said supporting member upon said slideway surface and movable lengthwise along said slideway surface with a surface thereof in sliding bearing contact with said slideway surface, said bearing surface of said movable member being covered by said slideway surface throughout the full extent of the movement of said movable member upon said slideway surface to maintain the bearing of said movable member upon said supporting member, said members being adapted to receive oil between said contacting bearing surfaces thereof to lubricate said surfaces as they move relative to each other, of a frame carried by said movable member and providing a wall opposite to and spaced from the surface of said slideway and extending to said movable member and a wall spaced from said movable member and extending from said first wall to and conforming substantially to the contour of said slideway surface, said walls cooperating with said slideway surface and said movable member to provide a chamber movable with said movable member and adapted in any position of said movable member along said slideway to receive oil leaking from between said surfaces, scraping means supported by said frame within said chamber in spaced relation to said movable member along said slideway surface, said scraping means bearing on said slideway surface to remove the oil clinging thereto and to deposit it within said chamber as said movable member moves upon said slideway surface, means supported by said frame and acting on said scraping means for biasing said scraping means into oil removing contact with said slideway surface, and means for conducting the oil deposited within said chamber to a place of disposal.

5. In a machine tool or the like the combination as defined in claim 4 in which said scraping means comprises a rigid backing supported by said frame within said chamber, and a contact member of soft material carried by said rigid backing member for contact with said slideway surface.

6. In a machine tool or the like the combination as defined in claim 1 in which said means movable along said slideway surface with said movable member and cooperating therewith and with the surface of said slideway to provide said chamber comprises a part of said movable member spaced outwardly from the main body of said movable member lengthwise of said slideway surface and separated from said body by a recess adjacent the end of said bearing surface of said movable member, said part of said movable member having a surface conforming to the contour of said slideway surface to prevent passage of oil along said slideway surface beyond said recess, said means for conducting the oil to a place of disposal cooperating with said movable member for collecting from said recess the oil received therein from between said bearing surfaces.

7. In a machine tool or the like the combination with a supporting member having a slideway surface of substantial length and width, and a member supported by said supporting member upon said slideway surface, said members being adapted for movement one relative to the other lengthwise of said slideway surface with a surface of said supported member in sliding bearing contact with said slideway surface, said bearing surface of said supported member being covered by said slideway surface throughout the full extent of the relative movement of said members to maintain the bearing of said supported member upon said supporting member, said members being adapted to receive oil between said contacting bearing surfaces thereof to lubricate said surfaces as they move relative to each other, of means cooperating with said supported member and with said surface of said slideway to provide a chamber movable with said supported member relative to said slideway surface and adapted in any position of said supported member along said slideway to receive oil leaking from between said surfaces, means supported within said chamber and cooperating with said slideway surface for preventing passage of the oil past said chamber upon said slideway surface, and means cooperating with said supporting and said supported members for conducting the oil entering said chamber therefrom to a place of disposal.

8. In a machine tool or the like the combination as defined in claim 1 in which said means movable along said slideway surface with said movable member and cooperating therewith and with the surface of said slideway to provide said chamber comprises a device carried by said movable member and providing closing walls of said chamber oppositely disposed relative to and in spaced relation respectively to said slideway surface and said member, said means supported within said chamber and cooperating with said slideway surface for preventing passage of the oil past said chamber being supported by said device for movement thereof with said device and said movable member, and means carried by said movable member and providing a drip element cooperating with said device for insuring deposit of the oil collected in said chamber in said oil conducting means.

CHARLES WILLIAM BERTHIEZ.

REFERENCES CITED

The following references are of record in the file of this patent:

UNITED STATES PATENTS

| Number | Name | Date |
|---|---|---|
| 570,726 | Butts | Nov. 3, 1896 |
| 1,258,129 | McCann | Mar. 5, 1918 |
| 1,938,786 | Vancil | Dec. 12, 1933 |
| 1,991,177 | Rutz et al. | Feb. 12, 1935 |